United States Patent
Gotcher et al.

(10) Patent No.: US 10,534,498 B2
(45) Date of Patent: Jan. 14, 2020

(54) MEDIA SYSTEM HAVING THREE DIMENSIONAL NAVIGATION VIA DYNAMIC CAROUSEL

(71) Applicant: Advanced Micro Devices, Inc., Sunnyvale, CA (US)

(72) Inventors: Michael C. Gotcher, Volente, TX (US); Raymond F. Dumbeck, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 163 days.

(21) Appl. No.: 15/340,564

(22) Filed: Nov. 1, 2016

(65) Prior Publication Data
US 2017/0046042 A1    Feb. 16, 2017

Related U.S. Application Data

(63) Continuation of application No. 12/616,946, filed on Nov. 12, 2009, now abandoned.

(51) Int. Cl.
*G06F 3/0481* (2013.01)
*G06F 3/0482* (2013.01)
*G06F 3/0484* (2013.01)

(52) U.S. Cl.
CPC ........ *G06F 3/04815* (2013.01); *G06F 3/0482* (2013.01); *G06F 3/04845* (2013.01)

(58) Field of Classification Search
CPC ............... G06F 3/04815; G06F 3/0482; G06F 3/04845; G06F 2203/04802
See application file for complete search history.

(56) References Cited

U.S. PATENT DOCUMENTS

| | | |
|---|---|---|
| 5,345,279 A | 9/1994 | Takaiwa et al. |
| 7,174,512 B2 | 2/2007 | Martin et al. |

(Continued)

FOREIGN PATENT DOCUMENTS

EP    0767418 A1    4/1997

OTHER PUBLICATIONS

International Search Report and Written Opinion for PCT Application No. PCT/US2010/055791 dated Jan. 4, 2011.
(Continued)

*Primary Examiner* — Roland J Casillas
(74) *Attorney, Agent, or Firm* — Volpe and Koenig, P.C.

(57) ABSTRACT

A system and method are set forth which combine an ability to view a motion video with an ability to simultaneously access computer programs. In certain embodiments, the media system provides access to movies, music and photos in a visually appealing three dimensional environment. In certain environments, the media system presents a three dimensional navigation tool (such as a three dimensional wheel) on which thumbnails are presented. A required resource value corresponding to system resources required to present individual thumbnails is generated, followed by the generation of an available resource value corresponding to system resources available to present media associated with the selected thumbnail. The available resource value and one or more required resource values are then processed to generate a consumed resource value, which is then used to limit the number of thumbnails presented.

18 Claims, 19 Drawing Sheets

(56) References Cited

U.S. PATENT DOCUMENTS

| | | |
|---|---|---|
| 8,028,250 B2 | 9/2011 | Vronay et al. |
| 2005/0010955 A1* | 1/2005 | Elia .................. G06F 3/0482 |
| | | 725/88 |
| 2005/0229110 A1 | 10/2005 | Gegner et al. |
| 2006/0236342 A1 | 10/2006 | Kunkel et al. |
| 2006/0274060 A1* | 12/2006 | Ni .................. G06F 3/0482 |
| | | 345/419 |
| 2007/0011702 A1 | 1/2007 | Vaysman |
| 2008/0068446 A1 | 3/2008 | Barkley et al. |
| 2008/0189911 A1 | 8/2008 | Loxam-Kohl |
| 2009/0077489 A1 | 3/2009 | Homma |

OTHER PUBLICATIONS

International Preliminary Report on Patentability for PCT Patent Application No. PCT/US2010/055791 dated May 24, 2012.
Anonymous, Spherical Menu Selector, Research Disclosure, Mason Publications, Hampshire GB, vol. 307, No. 123, Nov. 1, 1989.
Anonymous, Uses of the Spherical Selector, Research Disclosure, Mason Publications, Hampshire GB, vol. 307, No. 74, Nov. 1, 1989.

* cited by examiner

MEDIA SYSTEM HAVING THREE DIMENSIONAL NAVIGATION VIA DYNAMIC CAROUSEL

CROSS REFERENCE TO RELATED APPLICATIONS

This application is a continuation of U.S. patent application Ser. No. 12/616,946, filed Nov. 12, 2009, which is incorporated by reference as if fully set forth.

FIELD OF INVENTION

The present invention relates to computer systems and, more particularly, to combining application usage and motion video viewing via a media system.

BACKGROUND

The role of computers continues to evolve as a tool used for communications and media applications. Personal computers offer many new and exciting media applications for personal entertainment such as live television, personal video recording, playing or recording digital music, displaying or creating digital photographs, playing movies recorded on a DVD, etc.

Media controls may be provided by each application through its software user interface for interacting with content supported by that application. Such media controls are not available to other applications for users to control different multimedia content. Additionally, computer users are increasingly multitasking such as watching video on a television while using a computer, such as a portable computer to access other types of computer programs (e.g., accessing the Internet).

What is needed is a method and system to integrate these multiple tasks so as to facilitate video viewing while accessing computer programs within a single system.

SUMMARY

In accordance with the present invention, a system and method are set forth which combine an ability to view video with an ability to access computer programs. More specifically, in certain embodiments, the media system of the present invention provides access to movies, music and photos in a visually appealing three dimensional environment. Also, in certain environments, the media system presents a three dimensional navigation tool (such as a three dimensional wheel) on which multiple media files are presented. Also, in certain embodiments, a user may access both local and remote media files via the media system. Also, in certain embodiments, the media system provides on demand integration (such as Orb integration) while providing a consistent user interface such that access to local and remote content is seamless.

In one embodiment, the invention relates to a method for simultaneously accessing an application and viewing motion video. The method includes generating a media navigation screen presentation comprising a primary presentation portion and a multimedia portion. The primary presentation portion enables access to an application and the multimedia portion presents one or more motion videos simultaneous with access to the application. In one embodiment, a required resource value corresponding to system resources required to present individual motion videos is generated, followed by the generation of an available resource value corresponding to system resources available to present one or more motion videos. The available resource value and one or more required resource values are then processed to generate a consumed resource value, which is then used to limit the number of motion videos presented. The method also includes enabling interaction with the application while presenting the motion video.

In another embodiment, the invention relates to an apparatus for simultaneously accessing an application and viewing motion video. The apparatus includes means for generating a media navigation screen presentation that comprises a primary presentation portion and a multimedia portion. The primary presentation portion enables access to an application and the multimedia portion presents a motion video simultaneous with access to the application. In one embodiment, a required resource value corresponding to system resources required to present individual motion videos is generated, followed by the generation of an available resource value corresponding to system resources available to present one or more motion videos. The available resource value and one or more required resource values are then processed to generate a consumed resource value, which is then used to limit the number of motion videos presented. The apparatus also includes means for enabling interaction with the application while presenting the motion video.

In another embodiment, the invention relates to a media system stored on a computer readable medium. The media system comprises instructions to enable interaction with the application while presenting the motion video and instructions executable by a processor for generating a media navigation screen presentation which includes a primary presentation portion and a multimedia portion. In one embodiment, a required resource value corresponding to system resources required to present individual motion videos is generated, followed by the generation of an available resource value corresponding to system resources available to present one or more motion videos. The available resource value and one or more required resource values are then processed to generate a consumed resource value, which is then used to limit the number of motion videos presented. The primary presentation portion enables access to an application and the multimedia portion presents a motion video simultaneous with access to the application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION OF THE PREFERRED EMBODIMENTS

Figure 1:
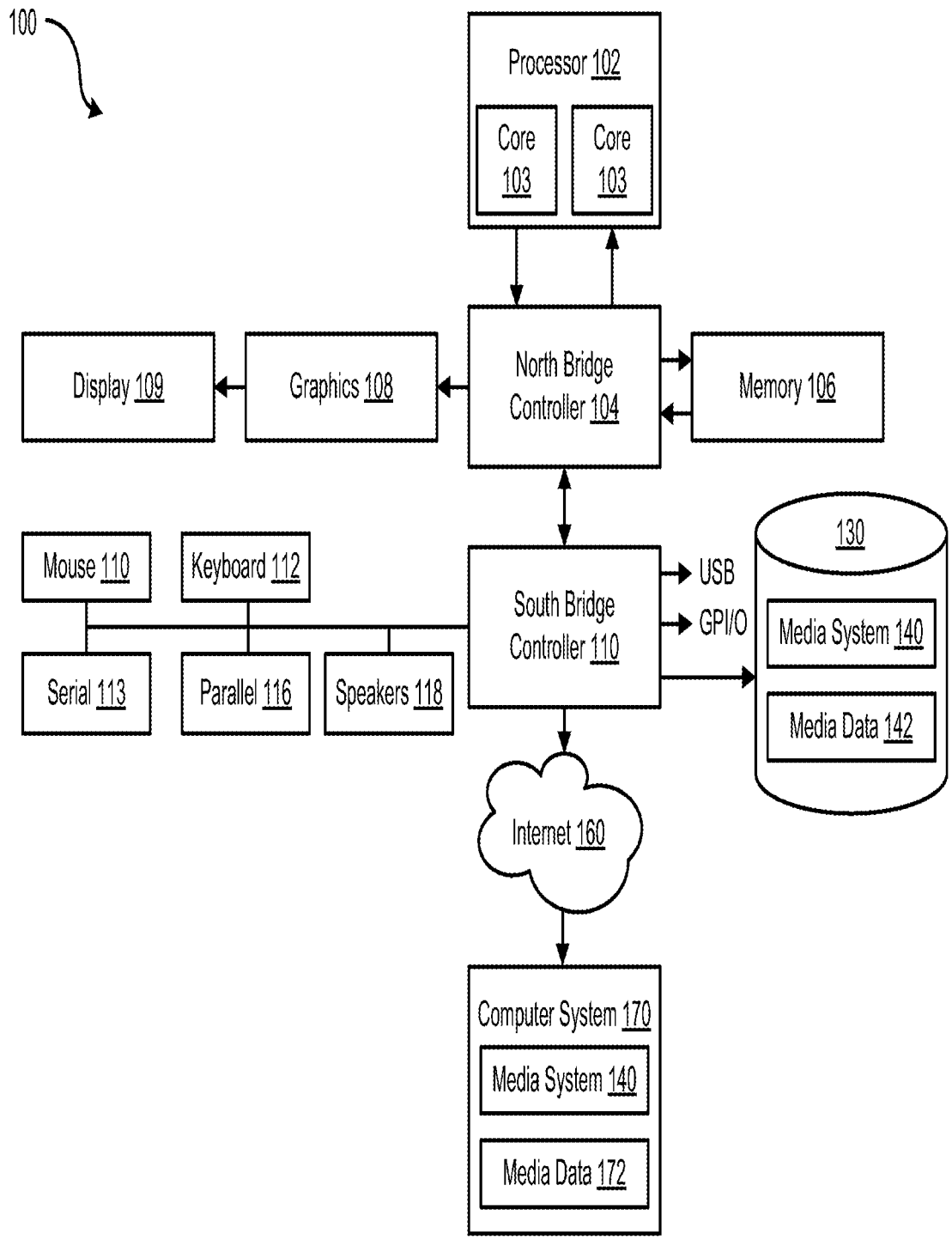
FIG. 1 shows a block diagram of a computer system having a media system in accordance with the present invention.

Referring to FIG. 1, a block diagram of a computer system is shown. The computer system 100 includes a processor 102, which may in certain embodiments include a plurality of processor cores 103. The computer system also includes utilizes a North Bridge Controller (North Bridge) 104 that controls interactions between the processor 102 and system resources such as a system memory 106 and a graphics controller 108 which is coupled to and controls a display 109. The computer system 100 also includes a South Bridge controller (South Bridge) 110 that controls interactions between processor 102 and I/O devices. South Bridge 110 typically has a PCI bus through which peripherals are interfaced to the computer system 100.

The South Bridge controller 110 may be coupled to a mouse 120, a keyboard 122, a serial connector 124, a parallel connector 126 as well as speakers 128. The South Bridge controller 110 may also be coupled to non-volatile memory such as a hard disk drive 130. The non-volatile memory stores a media system 140 which is executed by the processor 102. The non-volatile memory also stores media data 142 which is accessed via the media system 140. The media data is presented via, e.g., the display 109 and/or the speakers 128.

The South Bridge controller may also couple the computer system to the Internet 160, via e.g., a modem such as a wireless or broadband modem. One or more remote computer systems 170 may be coupled to the computer system 100 via the Internet 160. The remote computer system 170 may also include a media system 140 as well as media data 172.

Figure 2:
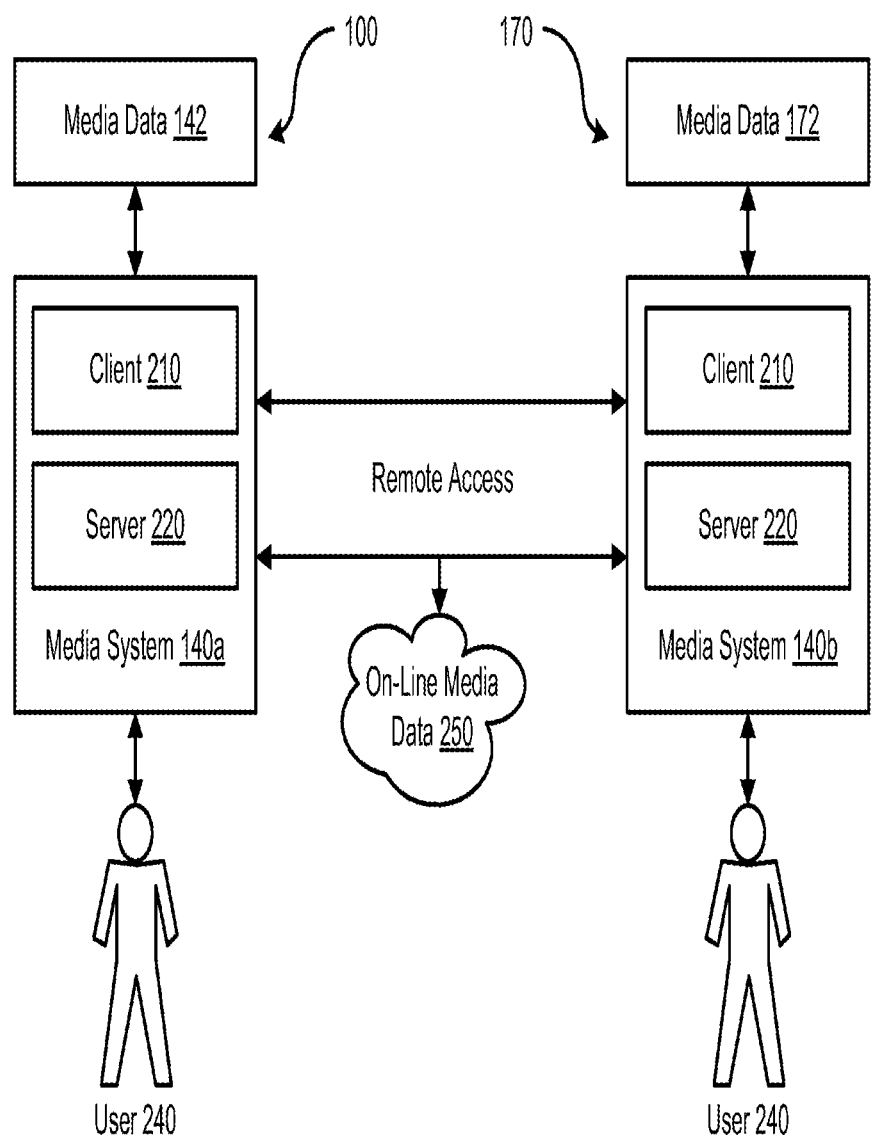
FIG. 2 shows a block diagram of the interaction of multiple media applications.

Referring to FIG. 2, a block diagram of the interaction of multiple media applications is shown. More specifically, a plurality of media systems can each include a client portion 210 and a server portion 220. Respective media systems 140 may be executing on the computer system 100 and a remote computer system 170. The media systems interact via remote access 230 (e.g., via the Internet).

By using the media system interaction, a user 240 who is interacting with the media system 140 executing on the computer system 100 can remotely access media data 172 which is stored on the remote computer system 170. More specifically, the client portion 210 of the media system 140*a* accesses the server portion 220 of the media system 140*b*. The server portion 220 of the media system 140*b* accesses and forwards the media data 172 stored on the remote computer system 170 for navigation and presentation via the client portion 210 of the media system 140*a*. Thus, the media system 140*a* allows for navigation and presentation of local media data 142 as well as remote media data 172. The media system 140 can also access, navigate and present online media data 250. The media system 140 also performs an aggregation and consolidation function by aggregating (i.e., by collecting media data (or references to disparate media data via path information) from disparate sources) and consolidating (i.e., joining the media data (or references to disparate media data via path information) from disparate sources together for access by a single media system)

Figure 3:
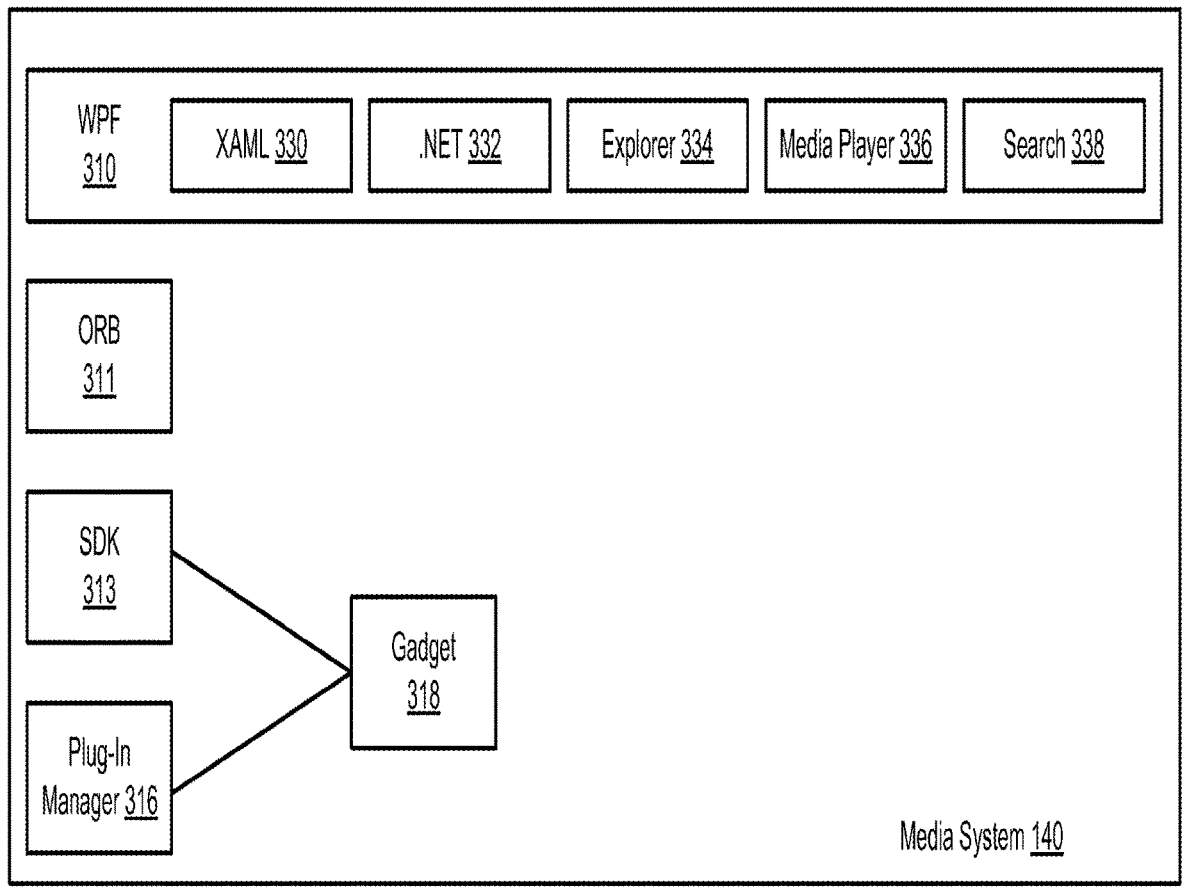
FIG. 3 shows a block diagram of a media aggregation and consumption application.

Referring to FIG. 3, a block diagram of a media system 140 is shown. The media system 140 provides media aggregation and consumption functionality when executing on a computer system. More specifically, the media system 140 includes a Windows Presentation Foundation (WPF) portion 310, an ORB portion 312. The media application also includes a software developers kit (SDK) portion 314 as well as a plug-in manager 316. The SDK portion 314 and the plug in manager 316 interact to enable the development and operation of gadgets 318.

The WPF portion 310 enables the media system to operate as a light weight application while taking advantage of the functionality that is provided by the WPF functionality that is included within certain operating systems such as the Microsoft Windows Vista operating system. For computer systems that are not executing an operating system that supports the WPF functionality, the WPF portion 310 provides this functionality within the media system itself. The WPF portion 310 includes an extensible application markup language (XAML) portion 330, a .net portion 332, a browser (e.g., explorer) portion 334, a media player portion 336 and a search portion 338.

The ORB portion 312 includes streaming software that enables users to remotely access personal digital media data such as including pictures, music, videos, webcams and television. The SDK portion 314 provides a set of development tools that facilitates create applications for the media system 140. In client systems, the SDK portion 314 provides an application program interface (API) via which the applications interact with the media system 140. The plug-in manager enables the media system 140 to support plug-ins. A plug-in is a computer program that interacts with the media system 140 to provide a certain, usually very specific, function often times an on demand type of function.

Figure 4:
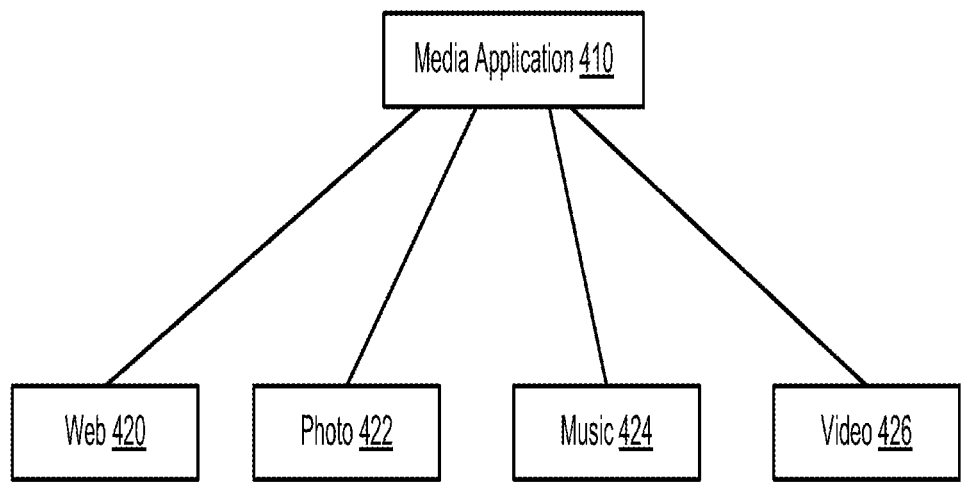
FIG. 4 shows a flow chart of the operation of a media aggregation and consumption application.

Referring to FIG. 4, a flow chart of the operation of the media system 140. More specifically, when the media system is launched at step 410, the media system 140 presents a media application introductory navigation screen presentation. The media application introductory navigation screen presentation (as well as many other screen presentations generated by the media system 140) includes a tab navigation portion as well as a multimedia side portion and a gadget portion. From this introductory navigation screen presentation, a user can navigate to a web function 420, a photo function 422, a music function 424 and a video function 426 using the tabs presented within the tab navigation portion.

Figure 5:
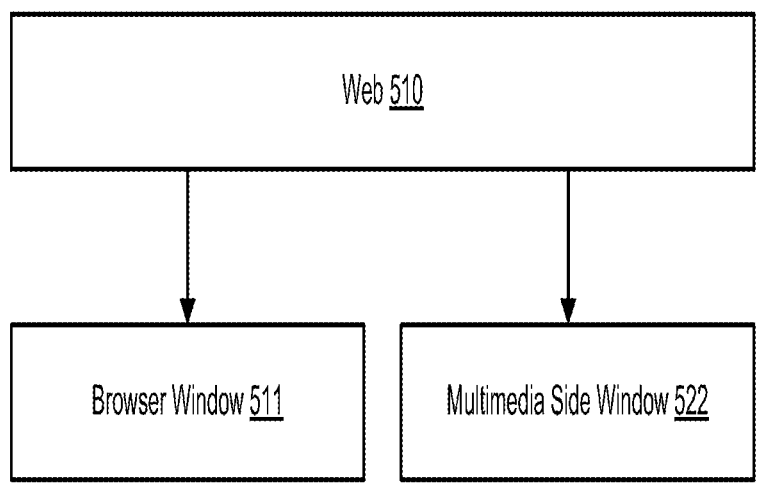
FIG. 5 shows a flow chart of a web portion of a media aggregation and consumption application.

Referring to FIG. 5, a flow chart of a web portion of the media system 140 is shown. More specifically, by selecting a web function from the tab navigation portion, a web navigation screen presentation is presented at step 510. The web navigation screen presentation includes a browser window 520 as well as a multimedia side window 522.

Figure 6:
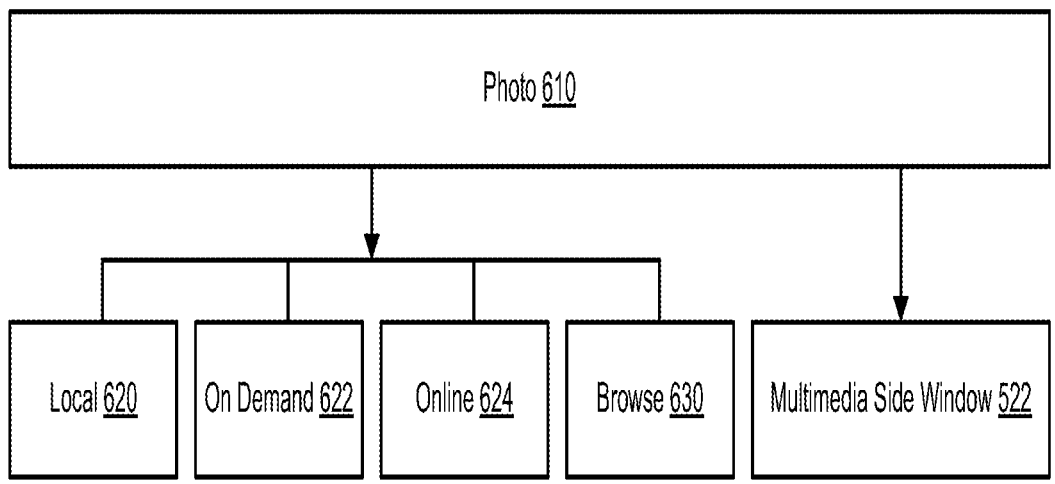
FIG. 6 a flow chart of a photo portion of a media aggregation and consumption application.

Referring to FIG. 6, a flow chart of a photo portion of the media system 140 is shown. More specifically, by selecting a photo function from the tab navigation portion, a photo navigation screen presentation is presented at step 610. The photo navigation screen presentation includes a photo navigation tabs which enable navigation within the photo portion of the media system. When operating within photo portion 610, the media system enables access to locally stored photos 620, to on demand photos 622 (e.g., photos that are stored remotely such as within the media data 172 of the remote computer system 170), and to photos that are stored online (e.g., photos that are stored at a photo service such as the Shutterfly photo service). When operating within the photo portion 620, the media system also provides a browse function 630 where a user can browse various locations in which photos may be stored. When operating within the photo portion, the media system 140 also presents the multimedia side window 522.

Figure 7:
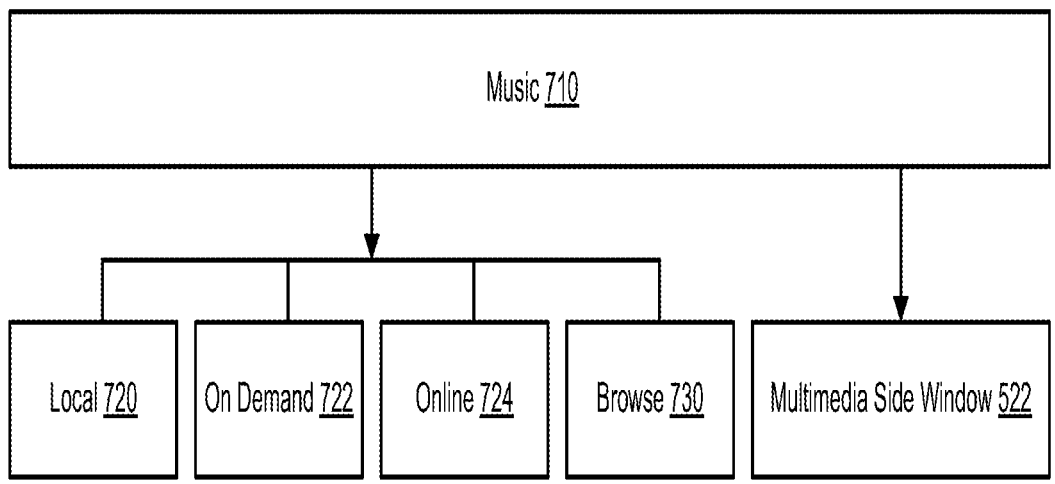
FIG. 7 a flow chart of a music portion of a media aggregation and consumption application.

Referring to FIG. 7, a flow chart of a music portion of the media system 140 is shown. More specifically, by selecting a music function from the tab navigation portion, a music navigation screen presentation is presented at step 710. The music navigation screen presentation includes music navigation tabs which enable navigation within the music portion of the media system 140. When operating within music portion 710, the media system enables access to locally stored music 720, to on demand music 722 (e.g., music that is stored remotely such as within the media data 172 of the remote computer system 170), and to music that is stored online (e.g., music that are stored at a music service such as the iTunes music service available from Apple Computer). When operating within the music portion 720, the media system also provides a browse function 730 where a user can browse various locations in which music may be stored. When operating within the music portion, the media system 140 also presents the multimedia side window 522.

Figure 8:
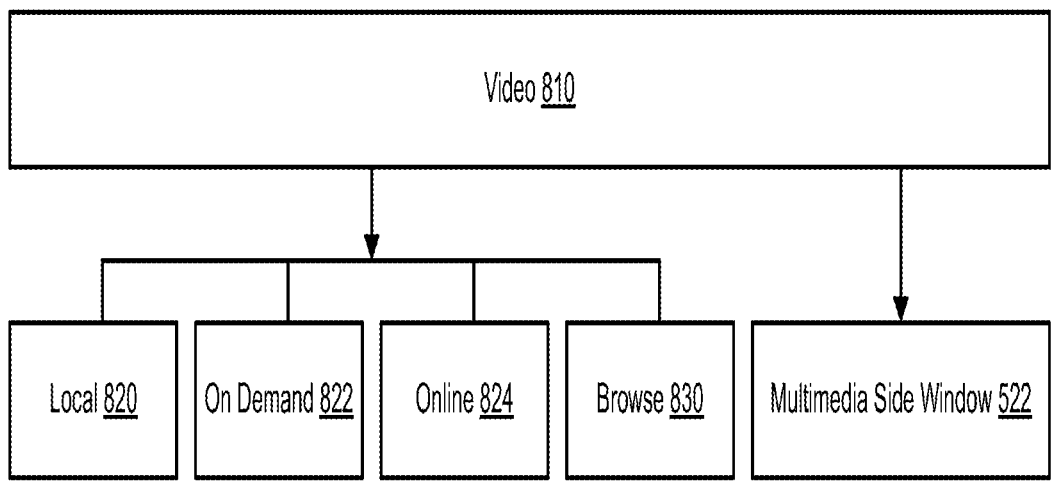
FIG. 8 a flow chart of a video portion of a media aggregation and consumption application.

Referring to FIG. 8, a flow chart of a video portion of the media system 140 is shown. More specifically, by selecting a video function from the tab navigation portion, a video navigation screen presentation is presented at step 810. The video navigation screen presentation includes a video navigation tabs which enable navigation within the video portion of the media system. When operating within video portion 810, the media system enables access to locally stored videos 820, to on demand videos 822 (e.g., videos that are stored remotely such as within the media data 172 of the remote computer system 170), and to videos that are stored online (e.g., videos that are stored at a video service such as the PodShow, or Movie link video services). When operating within the video portion 820, the media system also provides a browse function 830 where a user can browse various locations in which videos may be stored. When operating within the video portion, the media system 140 also presents the multimedia side window 522.

Figure 9:
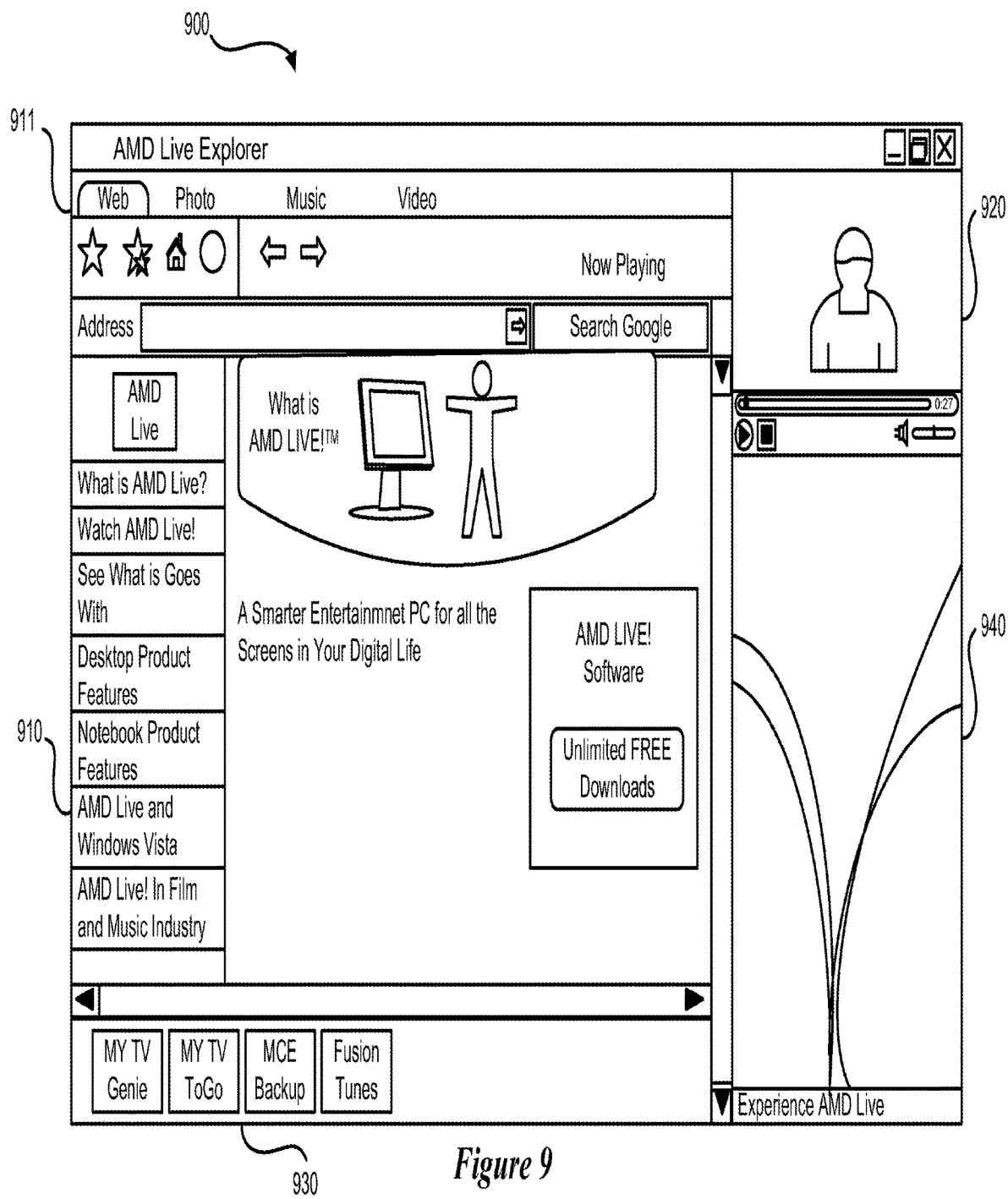
FIG. 9 shows an example introductory navigation screen presentation of a media system.

Referring to FIG. 9, an example introductory navigation screen presentation of the media system 140 is shown. More specifically, the media application introductory navigation screen presentation 900 (as well as many other screen presentations generated by the media system 140) includes primary presentation portion 910, which includes a tab navigation portion 912. The navigation screen presentation 900 also includes a multimedia side portion 920, an application portion 930 and a gadget portion 940.

The primary presentation portion 910 provides a portion of the screen presentation via which a selected function is presented. For the introductory navigation screen presentation, the selected function corresponds to an introductory application function. The selected function includes controls associate with that function. So for example, when the selected function is a browse function, the controls include browse controls. If the selected function were an application program, the application program is presented within the primary presentation portion 910. By providing the primary presentation portion 910 as well as a multimedia side portion 920, a user is able to view a media presentation, e.g., a television show, while interacting with whatever is presented within the primary presentation portion 910.

When the primary presentation portion is an introductory application function, this introductory application function can be tailored to inform a user how to use the media system 140. This introductory navigation screen presentation can also be customized by a user to be bypassed so that one of the other media functions is presented when the media system 140 is loaded by the computer system. From this introductory navigation screen presentation, a user can navigate to a web screen presentation, photo screen presentation, a music screen presentation, a video screen presentation and a television screen presentation using the tabs presented within the tab navigation portion 912.

Figure 10:
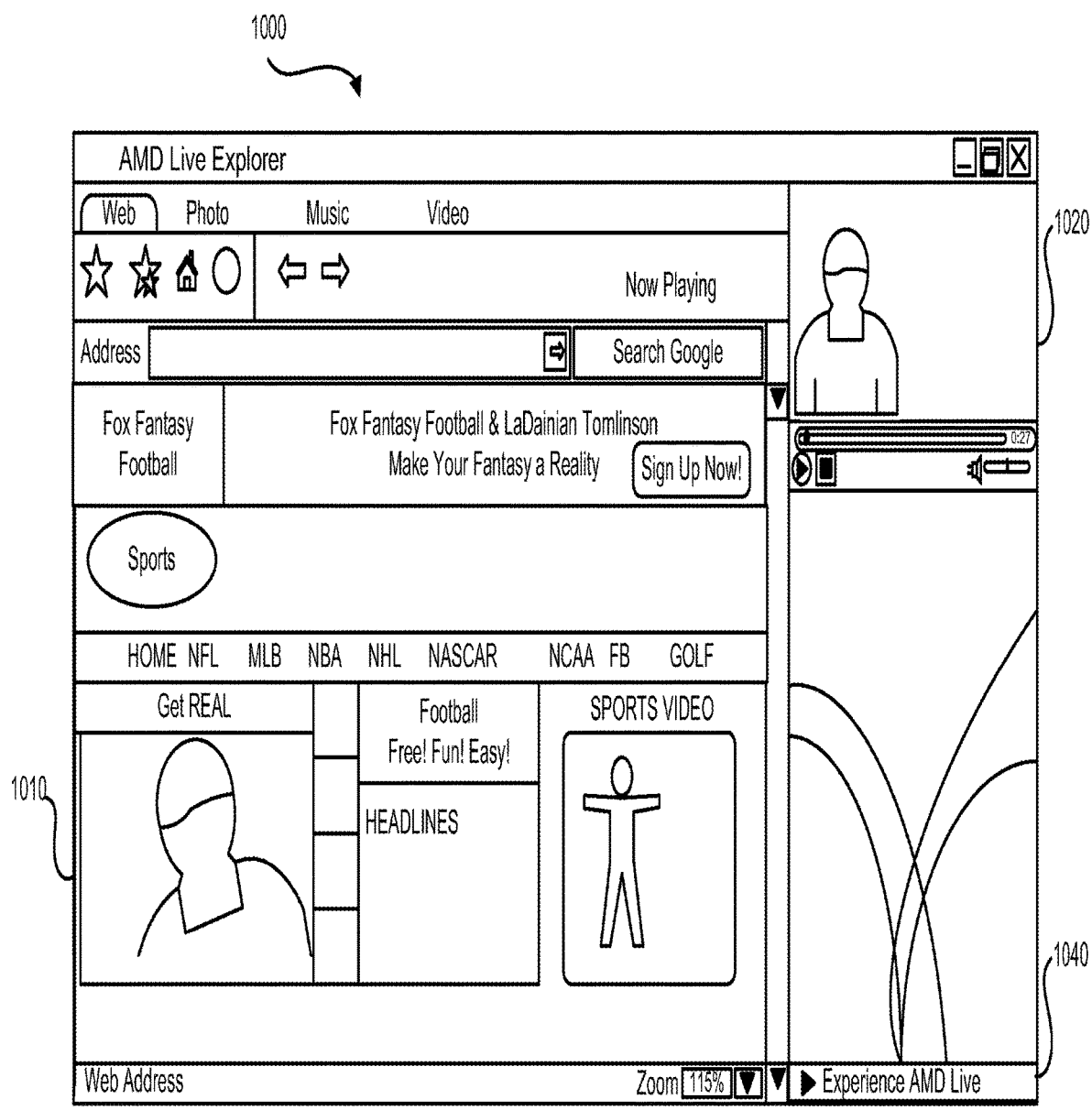
FIG. 10 shows an example of an application portion of a media system.

Referring to FIG. 10, an example screen presentation of the application portion (e.g., a web portion) of the media system 140 is shown. More specifically, by selecting a web function from the tab navigation portion 912, a web navigation screen presentation 1000 is presented. The web navigation screen presentation includes a browser window 1010 as well as a multimedia side window 1020. The browser window 1010 provides a web browser as is known in the art. The multimedia side window 1020 presents media such as a television show or other type of motion video. In this way, a user may intuitively browse the Internet while watching a television show. Also, the user may intuitively access gadgets, via the gadget window 1030 or access other types of application programs, via the application portion (shown minimized as 1040). While the user is browsing the Internet, if the user desires to view the motion video in full screen, the motion video may be presented full screen merely by actuating (e.g., by double clicking) the multimedia side window 1020.

Figure 11A:
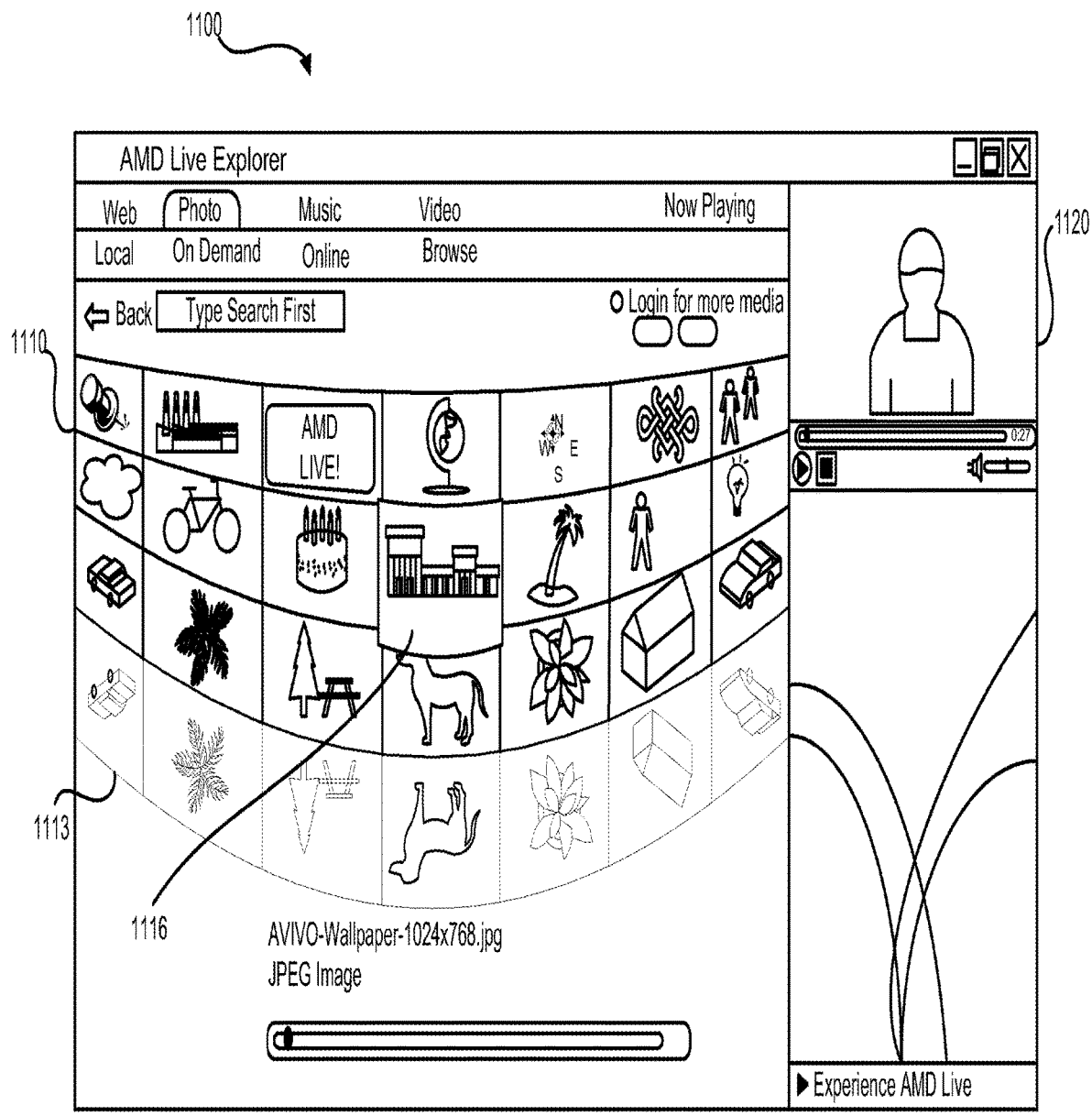
FIGS. 11A-11D show examples of screen presentations of a photo portion of a media system.

Referring to FIG. 11A, an example screen presentation 1100 of the photo portion of the media system 140 is shown. More specifically, by selecting a photo function from the tab navigation portion 1012, a photo navigation screen presentation 1110 is presented within the primary presentation portion. The photo navigation screen presentation 1100 includes photo navigation tabs 1110 which enable navigation within the photo portion of the media system.

Within the photo navigation screen presentation 1110, thumbnails of photos (e.g., one form of media data) are presented as a three dimensional analog of a partially rotating display 1114 (e.g., a rotating photo wall). The three dimensional analog provides the impression that the thumbnails are either closer or further away from the user based upon a location within the analog. Each thumbnail in the rotating display is presented as having a perspective that is relative to its position within the rotating display. Additionally, each thumbnail in the rotating display is presented as if the thumbnail is mounted on a curved surface (i.e., an arc). Thus, combining a plurality of thumbnails present a substantially continuous curve. (In certain embodiments, the thumbnails might be separated by a relatively small distance (e.g., by a distance that is less than 20 percent of the width and/or height of the thumbnail) but the impression of the curve across multiple thumbnails is maintained.) When generating the presentation, the media system 140 generates a curved surface and then paints the thumbnails onto the surface.

The rotating display can be actuated to present additional thumbnails by for example, moving the cursor to a right portion of the rotating display, to cause the display to rotate to the right, or to a left portion of the rotating display, to cause the display to rotate to the left. The rotating display can also be rotated by manipulating the position indicator 1113. The photo navigation screen presentation 1110 also provides a backdrop on which a shaded, mirror image of the bottom row of the thumbnails shown within the rotating display are presented.

When operating within photo portion 610, the media system enables access to locally stored photos, to on demand photos (e.g., photos that are stored remotely such as within the media data 172 of the remote computer system 170), and to photos that are stored online (e.g., photos that are stored at a photo service such as the Shutterfly photo service). When operating within the photo portion, the media system also provides a browse function where a user can browse various locations in which photos may be stored. When operating within the photo portion, the media system 140 also presents the multimedia side window 1120.

Figure 11B:
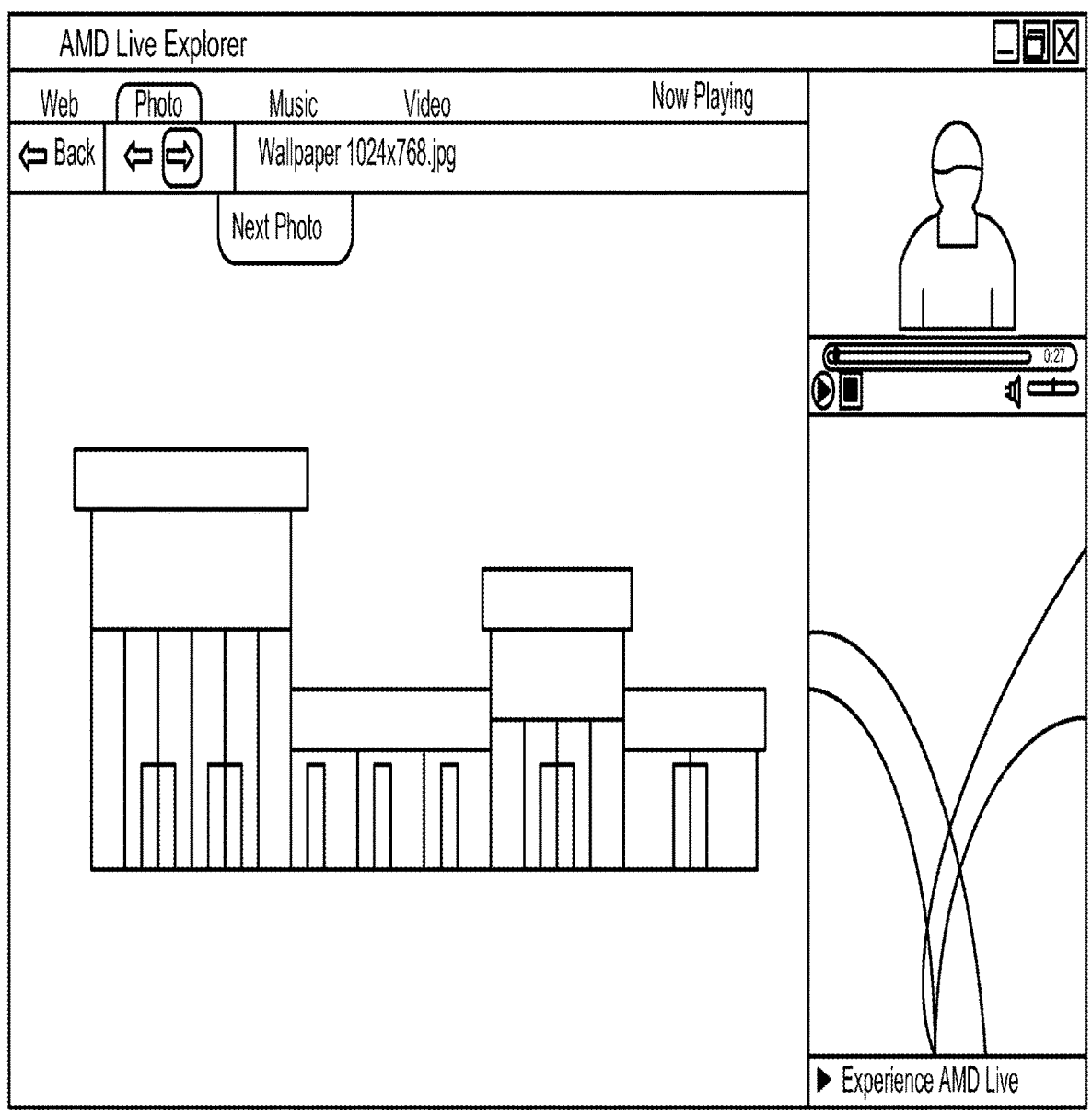

When hovering over a thumbnail, the thumbnail 1116 over which the hover is preformed is enlarged slightly compared to the other thumbnails on the three dimensional rotating display. By selecting one of the thumbnails (e.g., by double clicking on the thumbnail, to photo corresponding to the thumbnail is expanded to the size of the primary presentation portion (See e.g., FIG. 11B.) When the photo is expanded, the name of the photo is presented within an information and navigation portion 1140, which also includes navigation controls 1142 such as a back arrow as well as sequential navigation arrows, which permit navigating to other photos that are stored as part of the media data 142, 172.

Figure 11C:
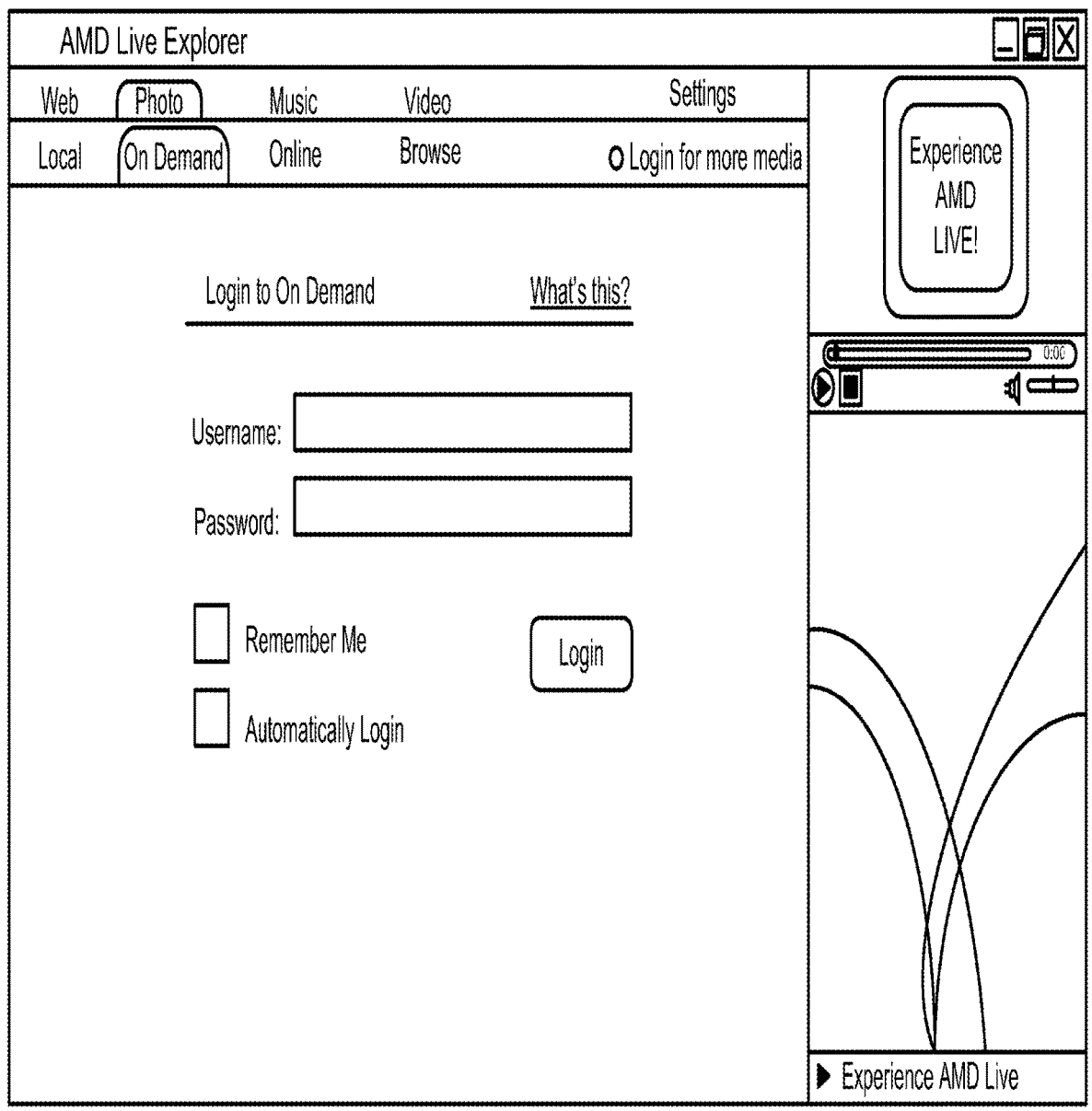
Figure 11D:
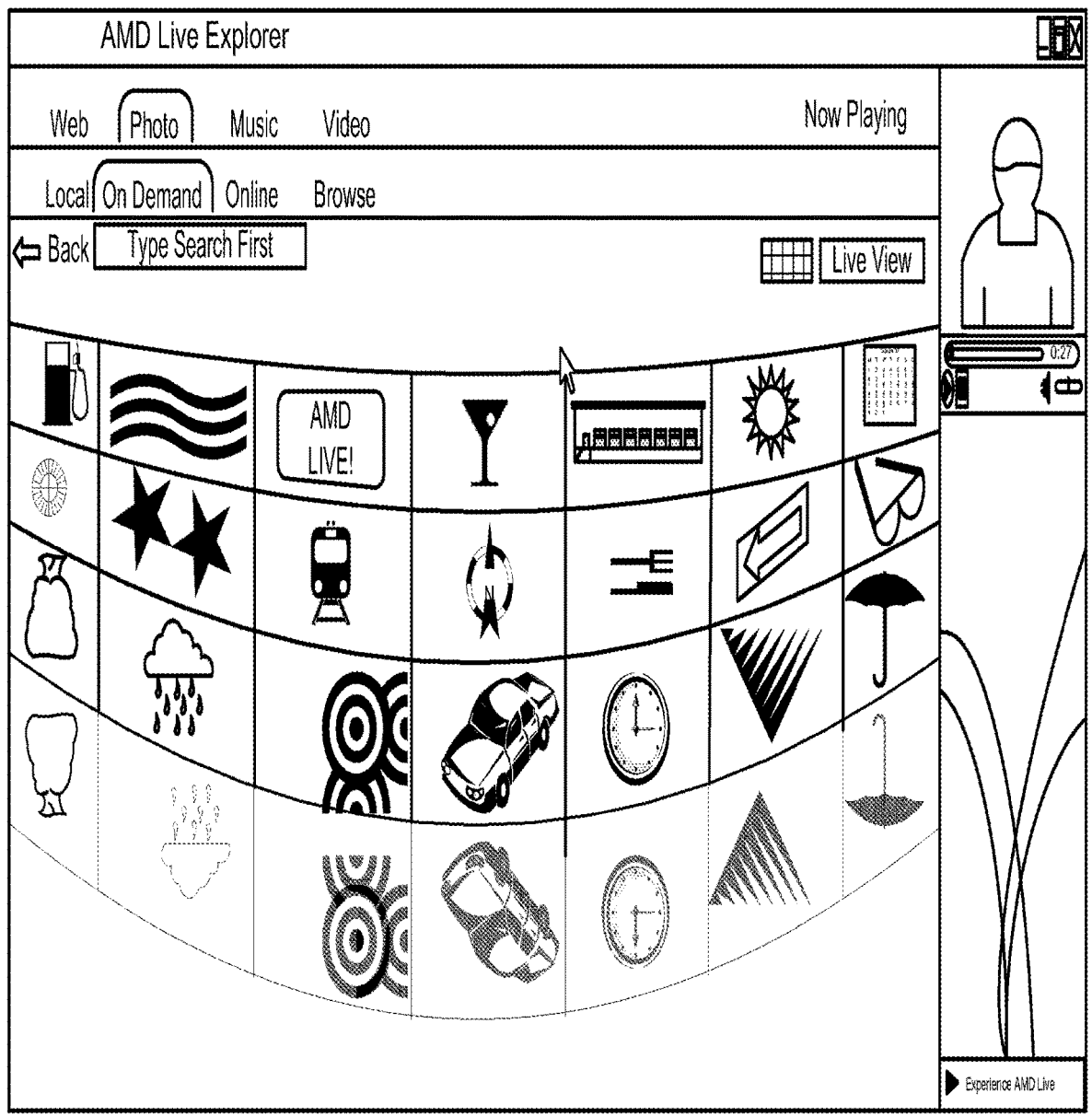

Referring to FIG. 11C, the media system 140 allows a user to access and view remotely stored photos (e.g., photos stored within media data 172), by selecting the on demand tab within the photo navigation tabs. The on demand portion of the photo portion enables a user to provide a user name and password to access photos that are remotely stored. After the user name and password are entered, then the remotely stored photos are presented using the same look and feel as photos that are stored locally. (See e.g., FIG. 11C.) In this way, a user can access photos on a home computer when traveling and using a portable computer system or even a mobile phone or personal digital assistant on which the media system is loaded.

Figure 12A:
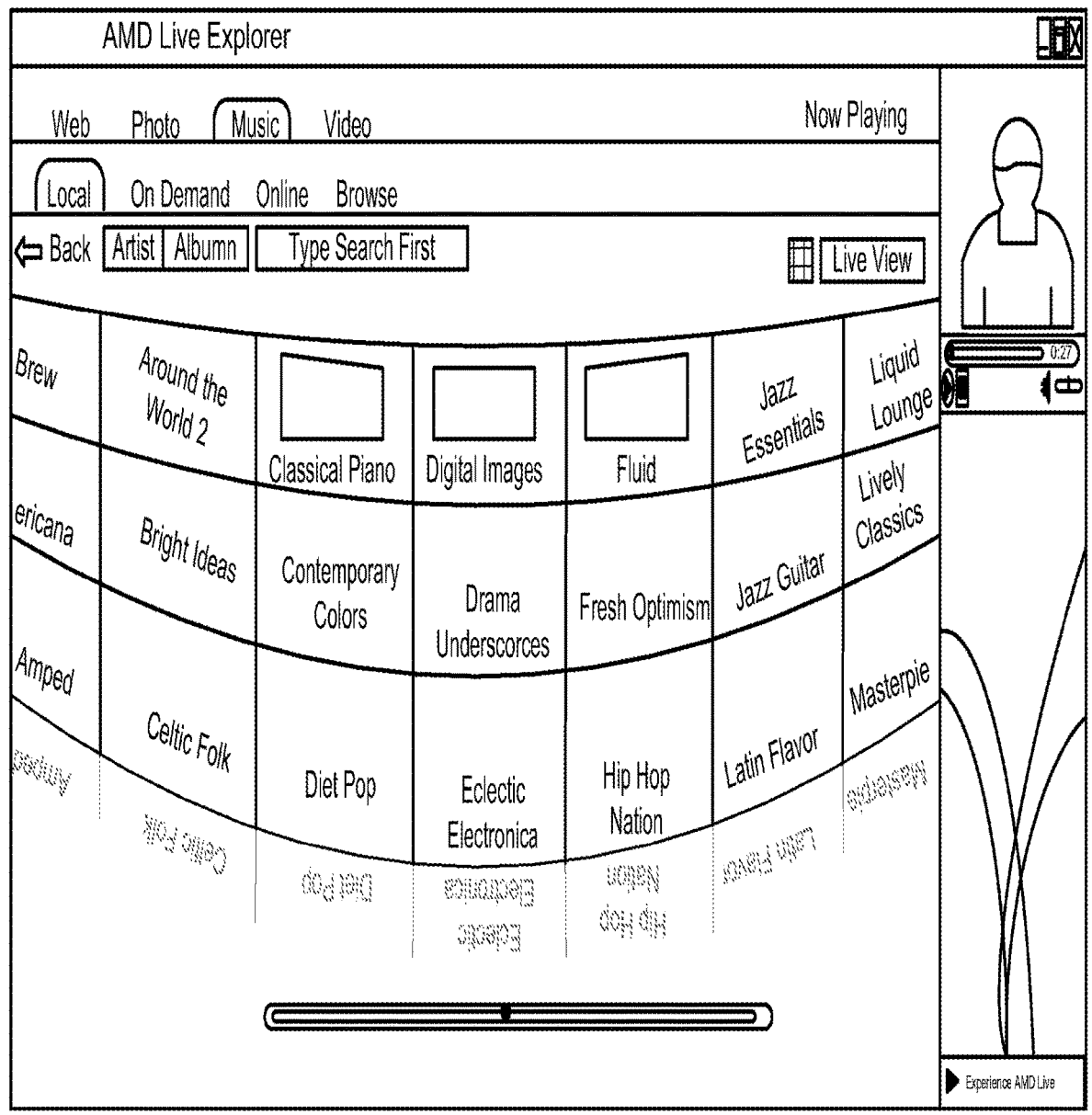
FIGS. 12A-12B show examples of screen presentations of a music portion of a media system.

Referring to FIG. 12A, an example screen presentation 1200 of the music portion of the media system 140 is shown. More specifically, by selecting a music function from the tab navigation portion 1012, a music navigation screen presentation 1200 is presented. The music navigation screen presentation 1200 includes music navigation tabs 1210 which enable navigation within the music portion of the media system 140.

Within the music navigation screen presentation 1210, thumbnails of music (e.g., one form of media data) are presented as a three dimensional analog of a partially rotating display 1214 (i.e., a rotating music wall). In certain embodiments, the thumbnails can correspond to album art that represents corresponding music files, to titles of the albums or to a combination of the album art and the titles. The three dimensional analog provides the impression that the thumbnails are either closer or further away from the user based upon a location within the analog. Each thumbnail in the rotating display is presented as having a perspective that is relative to its position within the rotating display. Additionally, each thumbnail in the rotating display is presented as if the thumbnail is mounted on a curved surface (i.e., an arc). Thus, combining a plurality of thumbnails present a substantially continuous curve. (In certain embodiments, the thumbnails might be separated by a relatively small distance (e.g., by a distance that is less than 20 percent of the width and/or height of the thumbnail) but the impression of the curve across multiple thumbnails is maintained.) When generating the presentation, the media system 140 generates a curved surface and then paints the thumbnails onto the surface.

The rotating display can be actuated to present additional thumbnails by for example, moving the cursor to a right portion of the rotating display, to cause the display to rotate to the right, or to a left portion of the rotating display, to cause the display to rotate to the left. The rotating display can also be rotated by manipulating the position indicator 1116. The music navigation screen presentation 1210 also provides a backdrop on which a shaded, mirror image of the bottom row of the thumbnails shown within the rotating display are presented.

When operating within the music portion 710, the media system 140 enables access to locally stored music, to on demand music (e.g., music that is stored remotely such as within the media data 172 of the remote computer system 170), and to music that is stored online (e.g., music that are stored at a music service such as the iTunes music service available from Apple Computer). When accessing the on demand music, an on demand portion of the music portion enables a user to provide a user name and password to access music that is remotely stored (such as shown with respect to FIG. 11C). After the user name and password are entered, then the remotely stored music is presented using the same look and feel as music that is stored locally. In this way, a user can access music stored on a home computer when traveling and using a portable computer system or even a mobile phone or personal digital assistant on which the media system is loaded. When operating within the music portion 720, the media system also provides a browse function where a user can browse various locations in which music may be stored. When operating within the music portion, the media system 140 also presents the multimedia side window 1220.

Figure 12B:
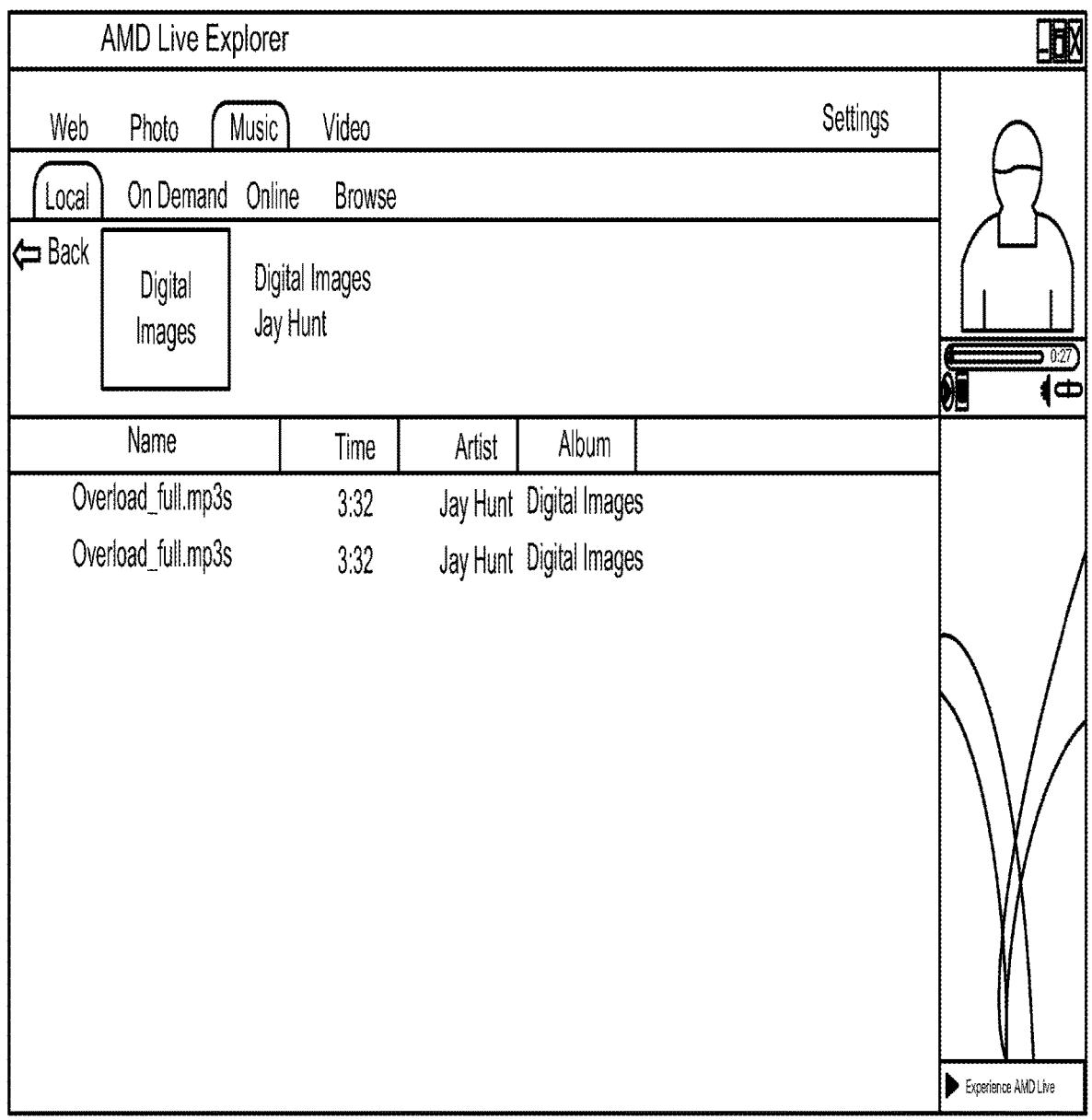

By selecting one of the thumbnails (e.g., by double clicking on the thumbnail) the music corresponding to the thumbnail is accessed and information regarding this music (e.g., tracks included within the album) are presented within primary presentation portion (See e.g., FIG. 12B.) In one embodiment, the audio content corresponding to the thumbnail is played upon a user gesture, such as the user performing a scroll-over the thumbnail. When the music is expanded, the name of the music is presented within an information and navigation portion 1240, which also includes navigation controls 1242 such as a back arrow as well as sequential navigation arrows, which permit navigating to other music files that are stored as part of the media data 142, 172.

Figure 13A:
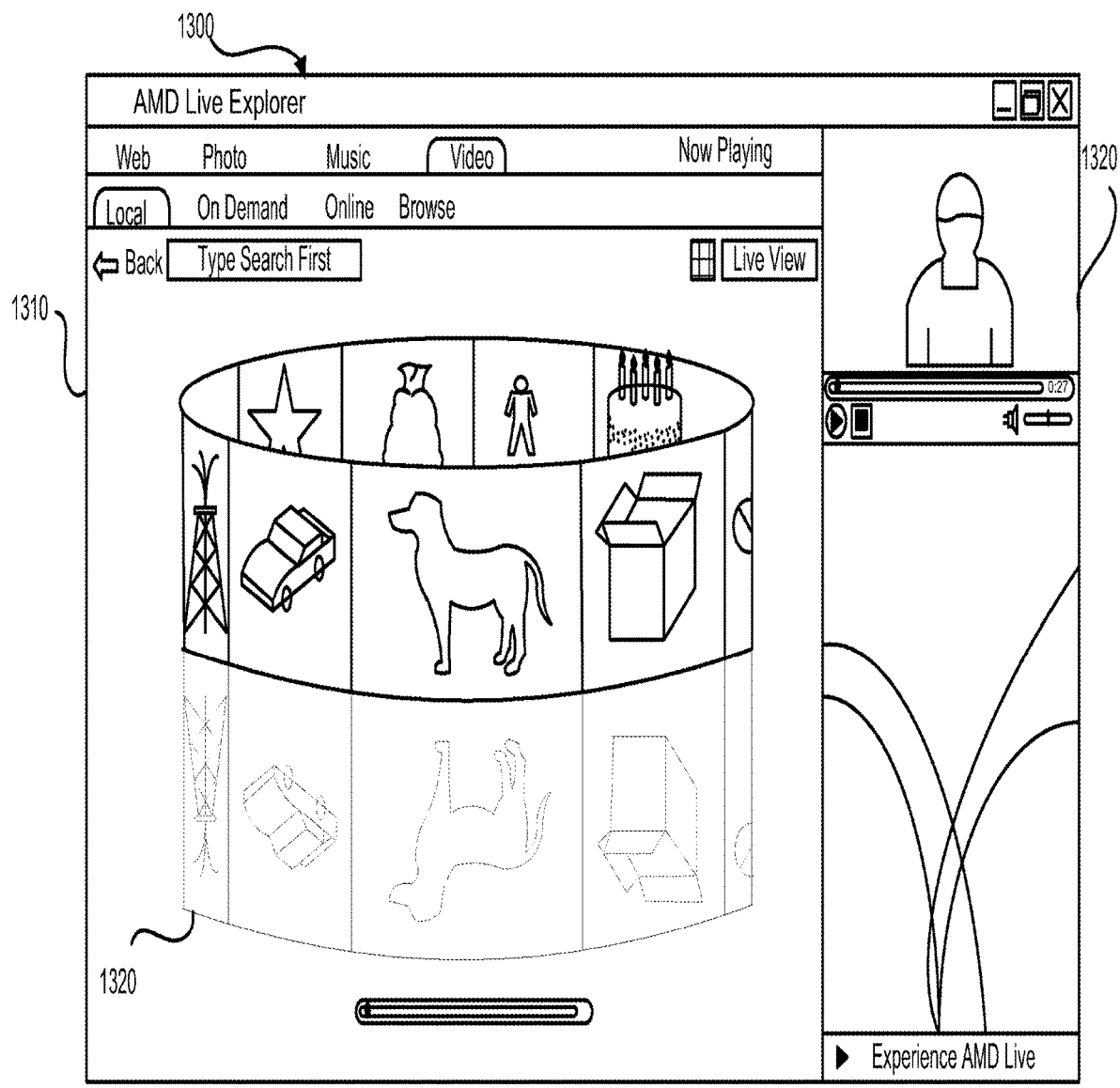
FIGS. 13A-13C show examples of screen presentations of a video portion of a media system.

Referring to FIG. 13A, an example screen presentation 1300 of the video portion of the media system 130 is shown. More specifically, by selecting a video function from the tab navigation portion 1012, a video navigation screen presentation 1300 is presented. The video navigation screen presentation 1300 includes a video navigation tabs 1310 which enable navigation within the video portion of the media system.

Within the video navigation screen presentation 1310, thumbnails of videos (e.g., one form of media data) are presented within a three dimensional analog of a rotating ring 1314 (i.e., a carousel). The thumbnails present motion video of the videos that they represent. In certain embodiments, the motion video presentation continues through an entire video presentation (e.g., through an entire television show or segment). The three dimensional analog provides the impression that the thumbnails are either closer or further away from the user based upon a location within the analog. Each thumbnail in the rotating display is presented as having a perspective that is relative to its position within the rotating display. Additionally, each thumbnail in the rotating display is presented as if the thumbnail is mounted on a curved surface (i.e., an arc). Thus, combining a plurality of thumbnails present a substantially continuous curve. (In certain embodiments, the thumbnails might be separated by a relatively small distance (e.g., by a distance that is less than 20 percent of the width and/or height of the thumbnail) but the impression of the curve across multiple thumbnails is maintained.) When generating the presentation, the media system 140 generates a curved surface and then paints the thumbnails onto the surface.

Additionally, in certain embodiments, the rotating display is presented as an off axis ring comprising a ribbon of concatenated thumbnails. In certain other embodiments, the rotating display is presented as an off axis, three dimensional (3D) curved surface. In these and other embodiments, thumbnails at the rear of the ring or 3D curved surface are presented in a backwards orientation (relative to the thumbnails that are toward the front of the ring), thus providing the impression that the user is viewing the rear of the thumbnail. Additionally, in certain embodiments, the three dimensional rotating display presents a reversed motion version of each of the video thumbnails for those thumbnails that are on the rear portion of the three dimensional display.

Additionally, in certain embodiments, the rotating display is tunably scalable. More specifically, when the media system 140 is executing on a less powerful system fewer video thumbnails might be presented or the motion video for the thumbnails might only be presented on a subset of the thumbnails on the rotating display. When the media system 140 is executing on a more powerful system, more video thumbnails might be presented or the motion video for all the video thumbnails (including the rear of the thumbnails that are on the rear of the rotating display) are presented. In certain embodiments, the more powerful system might be a system which includes one or more processors having a plurality of processor cores 103 (e.g., 2, 4 or 8 processor cores). By being tunably scalable, it is also possible to demonstrate the performance effect of having a processor with more cores versus a processor having fewer on a single core.

In various embodiments, a resource value corresponding to the system resources required to present an individual video. As an example, a standard definition (SD) video may have a resource value of '1', whereas a high definition (HD) video may have a resource value of '3'. Likewise, an available resource value corresponding to system resources available for presenting one or more videos is likewise generated. To further the preceding example, a system having 8 processor cores 103 may have an available resource value of '9'. In various embodiments, the available resource value and required resource values associated with target videos are processed to generate a consumed resource value, which is used to limit the number of videos presented. In these and other embodiments, the consumed resource value is not allowed to exceed the available resource value. In continuance of the preceding example, a user selects four target HD videos, each with a required resource value of '3', for presentment. However, the available resources for presentment of the target HD videos have a corresponding available resource value of '9', which would only allow three of the four HD videos to be presented. To use another example, the user may select two target HD videos, each with a required resource value of '3', for presentment. Assuming an available resource value of '9', the user may select an additional target HD video, with a corresponding available resource value of '3', or alternatively, up to three SD videos, each with a corresponding available resource value of '1', to be presented. In one embodiment, an individual video is presented in a degraded presentation state if its corresponding required resource value exceeds the available resource value. As an example, an HD video with a required resource value of '3' is selected for presentment. However, the available resources for presentment of the target HD video have a corresponding available resource value of '2', which would normally be insufficient to present the target HD video. As a result, the HD video is presented in a degraded mode, such as at SD video resolution.

The rotating display can be actuated to present additional thumbnails by for example, moving the cursor to a right portion of the rotating display, to cause the display to rotate to the right, or to a left portion of the rotating display, to cause the display to rotate to the left. The rotating display can also be rotated by manipulating the position indicator 1316. The video navigation screen presentation 1310 also provides a backdrop on which a shaded, mirror image of the thumbnails of videos shown within the rotating display are presented. These mirror images are also shown in motion video.

When operating within video portion 810, the media system enables access to locally stored videos, to on demand videos (e.g., videos that are stored remotely such as within the media data 172 of the remote computer system 170), and to videos that are stored online (e.g., videos that are stored at a video service such as the PodShow, or Movie link video services). When accessing the on demand videos, an on demand portion of the video portion enables a user to provide a user name and password to access videos that are remotely stored (such as shown with respect to FIG. 11C). After the user name and password are entered, then the remotely stored videos are presented using the same look and feel as videos that are stored locally. In this way, a user can access videos that are stored on a home computer when traveling and using a portable computer system or even a mobile phone or personal digital assistant on which the media system is loaded. When operating within the video portion 820, the media system 140 also provides a browse function where a user can browse various locations in which videos may be stored. When operating within the video portion, the media system 130 also presents the multimedia side window 1320.

Figure 13B:
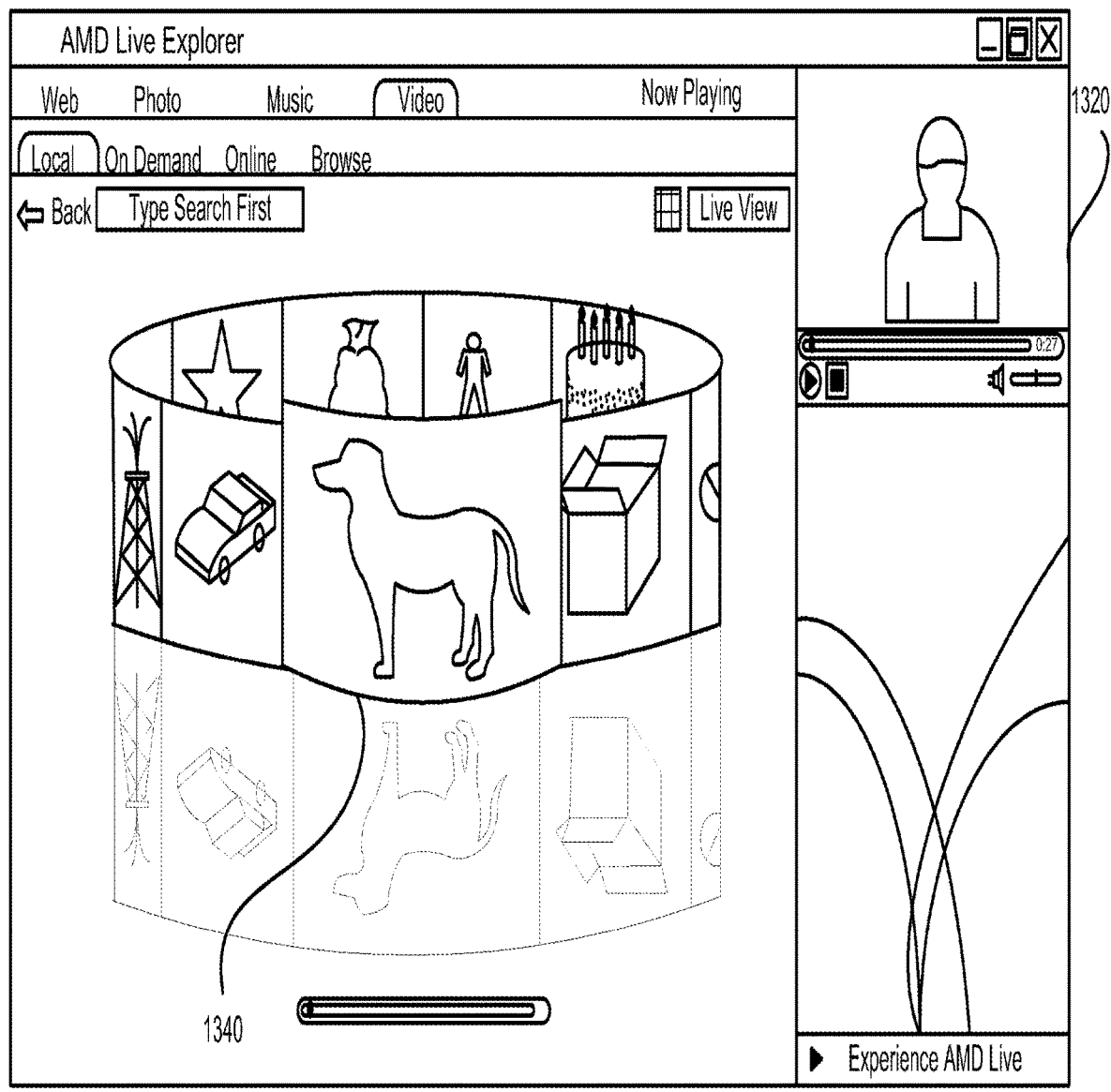

Referring to FIG. 13B, when a user hovers over a particular video thumbnail, the presentation of that video thumbnail is enlarged. In certain embodiments, this thumbnail is no longer presented as a three dimensional thumbnail, but rather as a flat screen thumbnail. Also, a title of the particular video thumbnail is presented within the video screen navigation presentation.

Figure 13C:
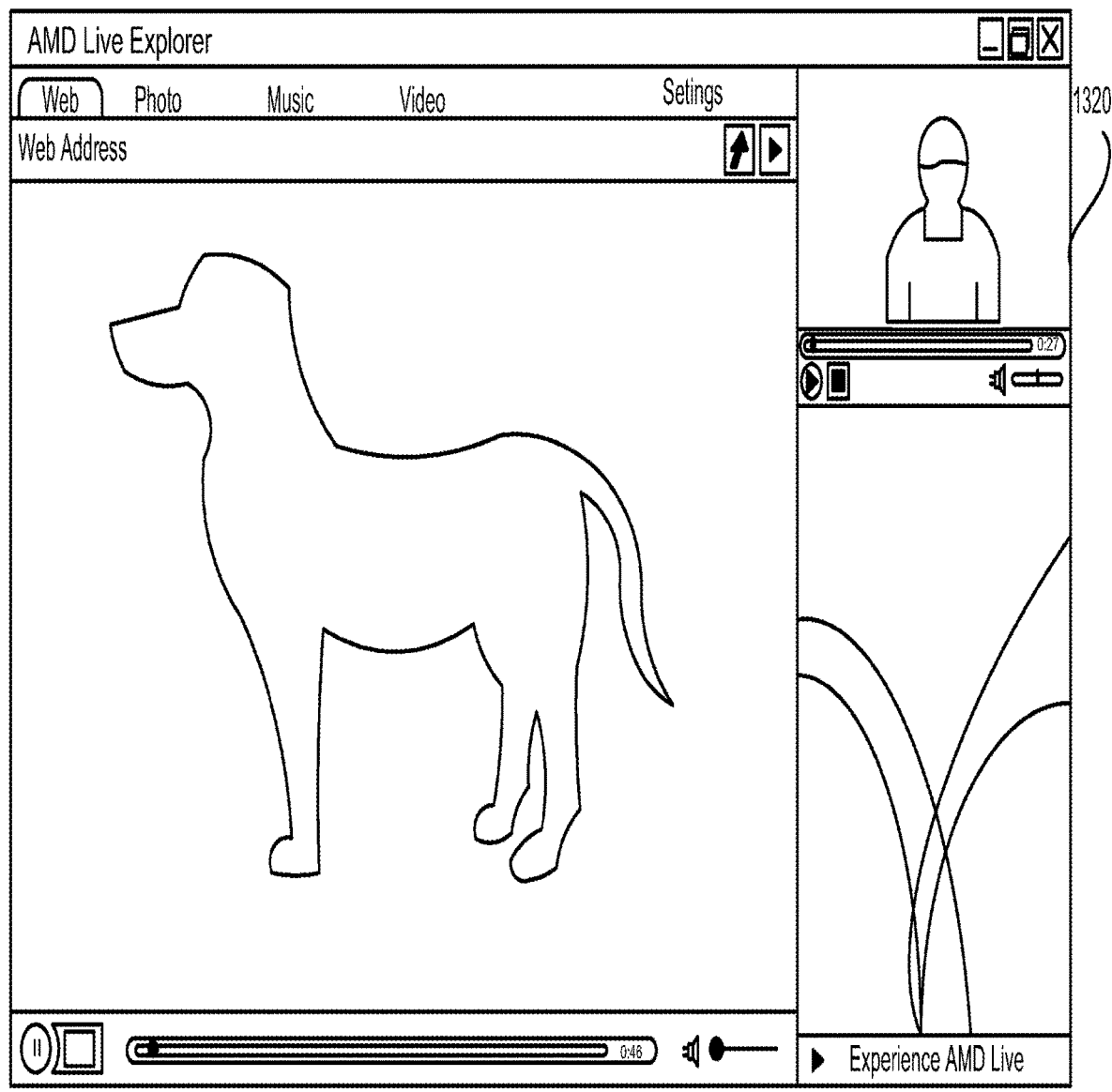

Referring to FIG. 13C, when a particular video thumbnail is actuated, this video that corresponds to the thumbnail is expanded and presented within the primary presentation portion. This video can then be selected for presentation within the multimedia side portion 1320 to allow other functions (e.g., executing of an application program or browsing of the internet) to be presented within the primary presentation portion. The video that is presented within the primary presentation portion can also be expanded to occupy an entire display area if desired.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the local and remote systems on which media data are stored are shown as computer systems, it will be appreciated that the media system may execute on other types of data processing systems such as mobile telephones, personal digital assistants, video game systems and set top boxes.

Also for example, it will be appreciated that the media data could further include television media data. This television media data could be obtained either via a broadcast signal (e.g., from a cable or satellite television service) or as a web streaming signal.

Also for example, it will be appreciated that other types of applications in addition to a web browser may be included within the application portion of the media system. For example, the media system may include access to productivity applications such as word processor programs, spreadsheet programs, database programs, etc. In this way a user may interact with the application program in the primary presentation portion while watching motion video in the multimedia side portion. Also for example, the media system may include access to application programs such as video conferencing type applications or media creation and editing type applications.

Also for example, the navigation functions within the media system 140 are consistently applied. So for example, a hover operation in the photo portion produces a result similar to a hover operation in the music portion or the video portion. Additionally, the on-demand operation is persistent across the various portions. So, when a user logs in to a remote system via the photo portion, this function is applied across the music and video portions of the media system.

Also for example, it will be appreciated that other types of three dimensional shapes are contemplated for presentation of the media data thumbnails. So for example, the video thumbnails might be presented as part of a sphere (where each thumbnail might be a shape within the sphere such as an octagon or a hexagon). Alternately, the three dimensional shape might be a pyramid or a cuboid (where each thumbnail is presented as part of the three dimensional shape).

Also for example, it will be appreciated that the media system can present nested three dimensional shapes. So for example, the video carousel can further include concentric rings of carousels where the rings could rotate in alternate directions.

Also for example, it will be appreciated that other navigation tabs can be included within the media system. More specifically, navigation tabs for television, gaming, media creation and editing and video conferencing can be included as additional navigation tabs.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example.

A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for use in a media system for navigating media data while simultaneously displaying motion video, the method comprising:
   generating a navigation screen presentation including a primary presentation portion and a multimedia portion, wherein the primary presentation portion includes a three dimensional analog rotating display of thumbnails associated with media data and the multimedia portion includes motion video;
   generating an available resource value corresponding to system resources required for presenting one or more videos associated with the presented three dimensional analog rotating display of thumbnails, the available resource value being assigned to the one or more videos based on the resolution of the respective one or more videos; and
   processing the available resource value and one or more required resource values to generate a consumed resource value based on any selected thumbnails, wherein the consumed resource value is used to limit the number of videos presented which limits the number of thumbnails selected in the three dimensional rotating display of thumbnails and the consumed resource value does not exceed the available resource value.

2. The method of claim 1, wherein the generated navigation screen presentation includes controls associated with the selected media data.

3. The method of claim 1, wherein the navigation screen presentation further includes any one or a combination of a tab navigation portion, an application portion, and a gadget portion.

4. The method of claim 1, further comprising manipulating the three dimensional analog to navigate the display of thumbnails while simultaneously displaying motion video.

5. The method of claim 1, further comprising, in response to a user selecting a thumbnail from the three dimensional analog rotating display of thumbnails, displaying media associated with the selected thumbnail in the primary presentation portion of the navigation screen presentation.

6. The method of claim 1, wherein the media data that is associated with the three dimensional analog rotating display of thumbnails is motion video.

7. A system for navigating media data while simultaneously displaying motion video, the media system comprising:
a processor configured to:
generate a navigation screen presentation including a primary presentation portion and a multimedia portion, wherein the primary presentation portion includes a three dimensional analog rotating display of thumbnails associated with media data and the multimedia portion includes motion video;
generate an available resource value corresponding to system resources required for presenting one or more videos associated with the presented three dimensional analog rotating display of thumbnails, the available resource value being assigned to the one or more videos based on the resolution of the respective one or more videos; and
process the available resource value and one or more required resource values to generate a consumed resource value based on any selected thumbnails, wherein the consumed resource value is used to limit the number of videos presented with limits the number of thumbnails selected in the three dimensional rotating display of thumbnails and the consumed resource value does not exceed the available resource value.

8. The system of claim 7, wherein the generated navigation screen presentation includes controls associated with the selected media data.

9. The system of claim 7, wherein the navigation screen presentation further includes any one or a combination of a tab navigation portion, an application portion, and a gadget portion.

10. The system of claim 7, wherein the processor is further configured to manipulate the three dimensional analog to navigate the display of thumbnails while simultaneously displaying motion video.

11. The system of claim 7, wherein the processor is further configured to, in response to a user selecting a thumbnail from the three dimensional analog rotating display of thumbnails, display media associated with the selected thumbnail in the primary presentation portion of the navigation screen presentation.

12. The system of claim 7, wherein the media data that is associated with the three dimensional analog rotating display of thumbnails is motion video.

13. A non-transitory computer-readable medium having computer-executable instructions for navigating media data while simultaneously displaying motion video stored thereon comprising operations which when executed by a computing device, causes the computing device to perform operations comprising:
generating a navigation screen presentation including a primary presentation portion and a multimedia portion, wherein the primary presentation portion includes a three dimensional analog rotating display of thumbnails associated with media data and the multimedia portion includes motion video;
generating an available resource value corresponding to system resources required for presenting one or more videos associated with the presented three dimensional analog rotating display of thumbnails, the available resource value being assigned to the one or more videos based on the resolution of the respective one or more videos; and
processing the available resource value and one or more required resource values to generate a consumed resource value based on any selected thumbnails, wherein the consumed resource value is used to limit the number of videos presented which limits the number of thumbnails selected in the three dimensional rotating display of thumbnails and the consumed resource value does not exceed the available resource value.

14. The non-transitory computer-readable medium of claim 13, wherein the generated navigation screen presentation includes controls associated with the selected media data.

15. The non-transitory computer-readable medium of claim 13, wherein the navigation screen presentation further includes any one or a combination of a tab navigation portion, an application portion, and a gadget portion.

16. The non-transitory computer-readable medium of claim 13, further comprising manipulating the three dimensional analog to navigate the display of thumbnails while simultaneously displaying motion video.

17. The non-transitory computer-readable medium of claim 13, further comprising, in response to a user selecting a thumbnail from the three dimensional analog rotating display of thumbnails, displaying media associated with the selected thumbnail in the primary presentation portion of the navigation screen presentation.

18. The non-transitory computer-readable medium of claim 13, wherein the media data that is associated with the three dimensional analog rotating display of thumbnails is motion video.

* * * * *